US008017190B2

(12) United States Patent
Hales et al.

(10) Patent No.: US 8,017,190 B2
(45) Date of Patent: Sep. 13, 2011

(54) METAL/FIBER LAMINATE AND FABRICATION USING A POROUS METAL/FIBER PREFORM

(75) Inventors: Stephen J. Hales, Newport News, VA (US); Joel A. Alexa, Hampton, VA (US); Brian J. Jensen, Williamsburg, VA (US); Roberto J. Cano, Yorktown, VA (US); Erik S. Weiser, Yorktown, VA (US)

(73) Assignee: United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 12/906,633

(22) Filed: Oct. 18, 2010

(65) Prior Publication Data

US 2011/0070793 A1    Mar. 24, 2011

Related U.S. Application Data

(62) Division of application No. 12/124,273, filed on May 21, 2008, now Pat. No. 7,851,062.

(60) Provisional application No. 60/941,793, filed on Jun. 4, 2007.

(51) Int. Cl.
*B05D 3/00* (2006.01)

(52) U.S. Cl. ............. 427/388.1; 427/455; 427/456; 427/389.8; 427/393.5; 427/404; 427/407.1; 427/407.3; 427/412; 427/412.1; 427/427; 427/427.2

(58) Field of Classification Search .................. None
See application file for complete search history.

(56) References Cited

U.S. PATENT DOCUMENTS

| | | | | |
|---|---|---|---|---|
| 3,646,749 | A * | 3/1972 | Clough et al. | 442/188 |
| 5,967,400 | A * | 10/1999 | Bell et al. | 228/124.5 |
| 7,250,194 | B2 * | 7/2007 | Aversenti et al. | 427/455 |
| 7,364,798 | B2 * | 4/2008 | Harada et al. | 428/469 |
| 7,595,112 | B1 * | 9/2009 | Cano et al. | 428/408 |
| 2009/0117269 | A1 * | 5/2009 | Hansen et al. | 427/212 |

* cited by examiner

*Primary Examiner* — Erma Cameron
(74) *Attorney, Agent, or Firm* — Thomas K. McBride, Jr.; Robin W. Edwards

(57) ABSTRACT

A metal/fiber laminate has a plurality of adjacent layers. Each layer is porous and includes an arrangement of fibers. At least one of the layers has its fibers coated with a metal. A polymer matrix permeates each such arrangement.

18 Claims, 3 Drawing Sheets

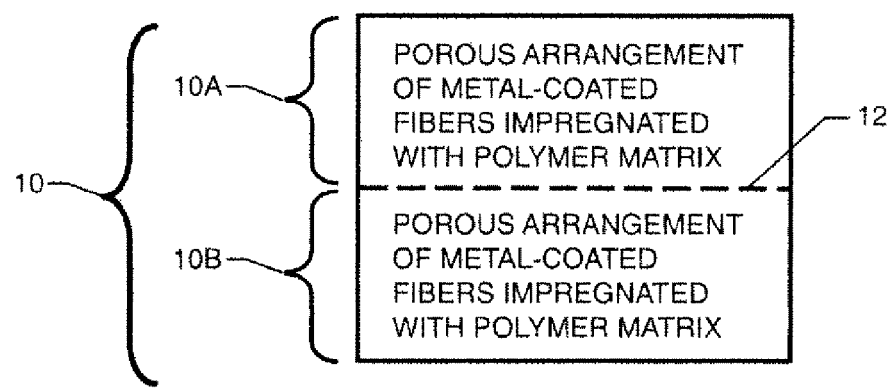
Fig. 1
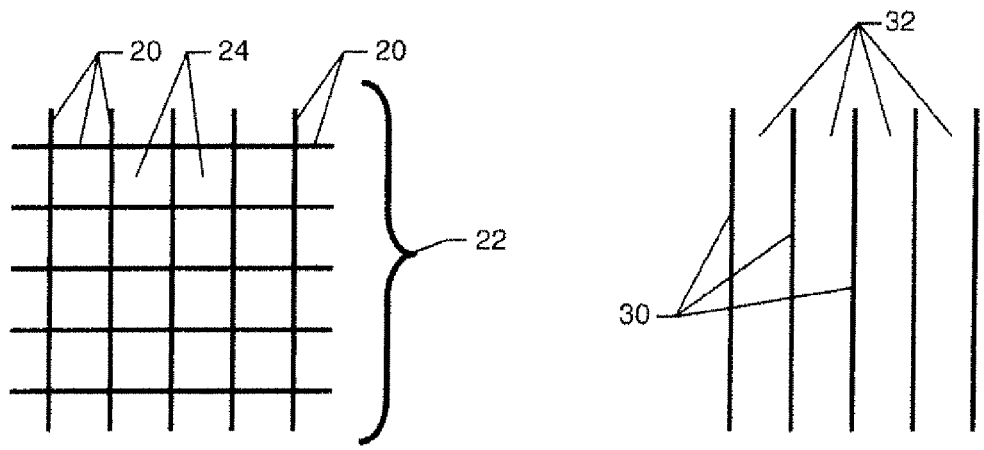
Fig. 2A  Fig. 2B

US 8,017,190 B2

METAL/FIBER LAMINATE AND FABRICATION USING A POROUS METAL/FIBER PREFORM

Pursuant to 35 U.S.C. §119, the benefit of priority from provisional application 60/941,793, with a filing date of Jun. 4, 2007, is claimed for this non-provisional application. This patent application is a divisional of U.S. patent application Ser. No. 12/124,273, filed May 21, 2008, now issued as U.S. Pat. No. 7,851,062 B2.

ORIGIN OF THE INVENTION

The invention was made in part by employees of the United States Government and may be manufactured and used by or for the Government of the United States of America for governmental purposes without the payment of any royalties thereon or therefor.

FIELD OF THE INVENTION

This invention relates to metal/composite laminates and the fabrication thereof. More specifically, the invention is a metal/fiber laminate and a fabrication method for the laminate that uses a porous metal/fiber preform.

DESCRIPTION OF THE RELATED ART

Metal/composite hybrid laminates provide a combination of structural and functional properties for a variety of applications to include aerospace structures. When comparing a structure made from a metal/composite hybrid laminate with one made from just the parent metal, the hybrid laminate-based structure is lighter in weight, has improved load bearing ability, is stiffer, and has improved fatigue properties. When comparing the hybrid laminate-based structure with one made from just the parent composite, the hybrid laminate-based structure has improved impact resistance, damage tolerance, and permeation resistance.

Currently, metal/composite hybrid laminates are prepared by compressing (e.g., using a press, autoclave, etc.) layers of metal sheets interleaved with layers of fibrous sheets previously impregnated with a resin. The fibrous sheets can be comprised of unidirectionally-arranged fibers or a mesh of woven fibers. The layered structure is typically placed in a mold prior to compression processing thereof. However, both autoclave and press molding techniques require complex tooling and are limited in size/shape owing to the size limitations of autoclave or press molding equipment.

More recently, U.S. patent application Ser. No. 11/461,150, filed Jul. 31, 2006, now issued as U.S. Pat. No. 7,595,112 B1, disclosed a resin infusion method for fabricating a metal/composite hybrid laminate. Briefly, one or more layered arrangements are stacked on a solid base to form a layered structure. Each such layered arrangement is defined by a fibrous material and a perforated metal sheet. A resin in its liquid state is introduced along a portion of the layered structure while a differential pressure is applied across the laminate structure until the resin permeates the fibrous material of each layered arrangement and fills perforations in each perforated metal sheet. The perforations facilitate the resin infusion through the thickness of the laminate since the metal sheets are not porous. The resin is then cured to yield a metal/composite hybrid laminate having improved strength as compared to the hybrid laminates made from alternating layers of metal and resin-impregnated fibrous sheets. However, there is no mechanical bond between the fibrous material and the faces of the perforated metal sheet prior to resin infusion.

SUMMARY OF THE INVENTION

Accordingly, it is an object of the present invention to provide a metal/composite laminate.

Another object of the present invention is to provide a metal/composite laminate having improved bond strength.

Still another object of the present invention is to provide method of fabricating a metal/composite laminate having improved bond strength.

Yet another object of the present invention is to provide a porous metal-fiber preform.

Other objects and advantages of the present invention will become more obvious hereinafter in the specification and drawings.

In accordance with the present invention, a metal/fiber laminate has a plurality of adjacent layers. Each layer includes an arrangement of fibers. At least one of the layers has the fibers associated therewith coated with a metal. Coated or uncoated, each such arrangement is porous. A polymer matrix permeates each such arrangement.

The present invention also presents a method of fabricating the metal/fiber laminate. In teams of a metal-coated fiber layer, a porous arrangement of fibers is first coated with a metal to form a porous arrangement of metal-coated fibers. A layered structure of porous layers is then formed that includes at least one layer of the porous arrangement of metal-coated fibers. A liquid resin is infused into the entire layered structure. The liquid resin is cured to form a polymer matrix that permeates the layered structure.

BRIEF DESCRIPTION OF THE DRAWINGS

FIG. 1 is a schematic view of a metal/fiber laminate in accordance with an embodiment of the present invention;

FIG. 2A is a schematic plan view of fibers in the form of a fabric for use in the laminate of the present invention;

FIG. 2B is a schematic plan view of fibers arranged in a unidirectional fashion for use in the laminate of the present invention;

DETAILED DESCRIPTION OF THE INVENTION

Figure 3A:
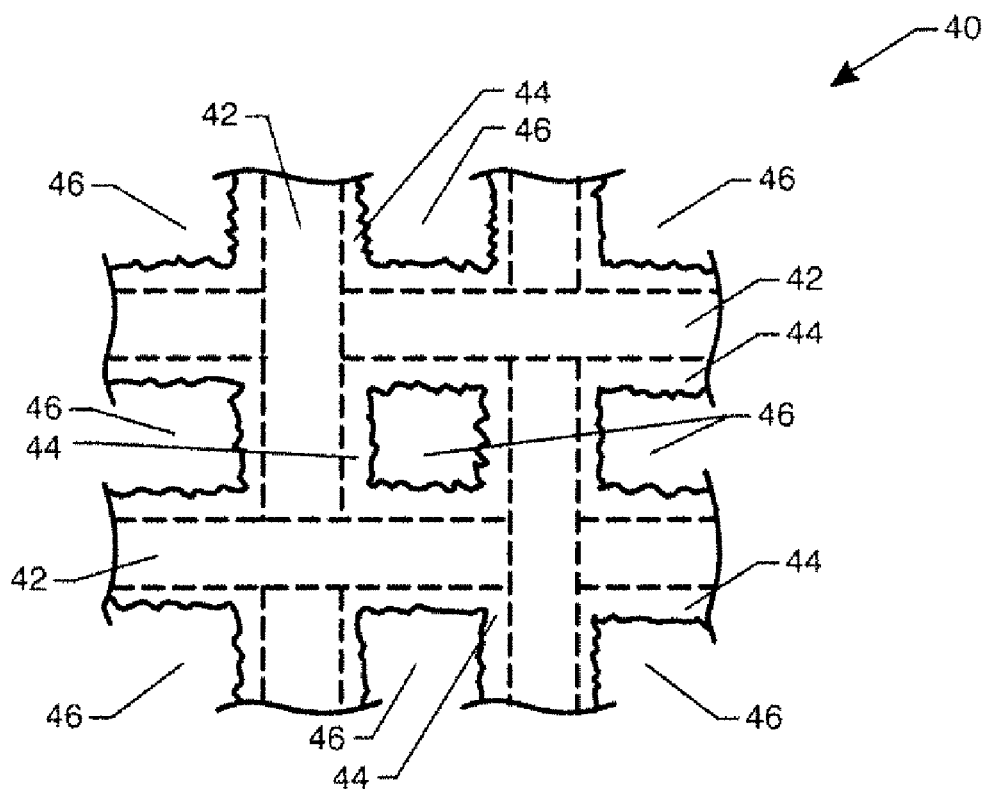
FIG. 3A is a plan view of one example of a fabric section spray coated with metal in accordance with a fabrication step of the present invention.

Referring now to the drawings and more particularly to FIG. 1, a metal/fiber laminate in accordance with the present invention is shown schematically and is referenced generally by numeral 10. Although laminate 10 is illustrated with two layers 10A and 10B, it is to be understood that more layers can be provided without departing from the present invention. There are even some applications that might only require one such layer as will be explained further below. It is further to be understood that layers 10A/10B and the resulting laminate 10 can be planar or complex in shape without departing from the scope of the present invention.

In general, each layer 10A and 10B of laminate 10 is a porous arrangement of metal-coated fibers with the porosity of such arrangement being permeated with a polymer matrix. As would be understood in the art, the term "fibers" as used herein includes individual fibers as well as multi-fiber tows. As will be explained further below, the polymer matrix typically begins as a liquid resin infused into the laminate such that, when the resin is cured to a polymer, the resulting polymer matrix is contiguous between the layers where such contiguousness is indicated by dashed line 12 between layers 10A and 10B. The infusion of the liquid resin can be performed in a variety of ways without departing from the scope of the present invention. Some examples of resin infusion include resin transfer molding, resin film infusion, and vacuum assisted resin transfer molding as disclosed in U.S. patent application Ser. No. 11/461,150, filed Jul. 31, 2006. Regardless of the infusion method used, once the liquid resin permeates layers 10A and 10B, a curing step solidifies the resin to form a polymer matrix that is part of laminate 10. The particular resin can be chosen to suit the needs of a particular application. Typical resins include epoxies, cyanates, bismaleimides and imides.

The fibers in each layer 10A and 10B can be chosen from a wide variety of materials used in the fabrication of composites. Such materials include, but are not limited to, glass, carbon, graphite, aramid, polyethylene, and polybenzoxazole. The fibers in each layer can be made from the same material or multiple materials without departing from the scope of the present invention. Further, the fiber materials(s) used in one layer can be different than those used in another layer. Still further, the arrangement of the fibers in each layer can be the same or different without departing from the scope of the present invention.

Two examples of fiber arrangements are shown in FIGS. 2A and 2B. In FIG. 2A, fibers 20 are arranged to form a porous fabric 22. As used herein, the term "fabric" refers to woven, braided, knitted, etc., fabrics. In each case, fabric 22 will have interstices 24 defined between fibers 20. The particular angle formed where any two of fibers 20 cross or intersect is not a limitation of the present invention as a fabric's fiber orientations can be designed for a specific application. In FIG. 2B, fibers 30 are arranged unidirectionally such that gaps 32 are defined therebetween. The method used to provide gaps 32 during fabrication of the present invention is not a limitation of the present invention.

In accordance with the present invention, a fiber arrangement that is to be incorporated into a laminate of the present invention is coated with a metal such that the resulting metal-coated fiber arrangement is porous. Typically, the fiber arrangement is formed and then coated with the metal of choice. However, the present invention is not so limited as individual fibers could also be coated with metal prior to their incorporation into a metal-coated fiber arrangement. Nearly all types of metals and their alloys can be used in the present invention. For example, the metals can be electrically and/or thermally conductive depending on the requirements of the ultimate application. Metals typically used include aluminum, copper, nickel, palladium, platinum, titanium, alloys thereof, and compositions thereof.

The particular coating process used is not a limitation of the present invention provided that the resulting metal-coated fiber arrangement is porous. Typically, the metal will be sprayed onto the fibers in order to control the amount of metal deposition. One type of spray coating technique suitable for use in the present invention is known as low-pressure radio frequency plasma spray deposition. In accordance with this known process, the metal is sprayed onto a substrate (e.g., fibers in the present invention) that is processed in a low-pressure environment (e.g., a chamber filled with an inert gas that is controlled to be at a pressure on the order of ¼ of an atmosphere) filled with an inert gas. Briefly, radio frequency energy is used to generate a plasma plume in the chamber. Metal powder is then injected into the plasma plume. The sprayed-in metal particles become near molten as they travel through the plasma plume. When the near-molten particles strike the substrate (e.g., fibers), the near molten metal particles rapidly solidify to coat the substrate.

The particle nature of the plasma spray technique yields a coating surface that (i) can be porous at thin thicknesses thereof, and (ii) is microscopically rough and, therefore, high in surface area. This process imparts very little heat to the substrate while the metal particles form strong bonds between themselves and the substrate. The amount of metal deposited can be controlled to a specific thickness (e.g., thin enough to be a porous metal coating), to control porosity of the metal-coated fiber arrangement, and to control the properties of the ultimate laminate based on the metal-coated fiber arrangement.

Figure 3B:
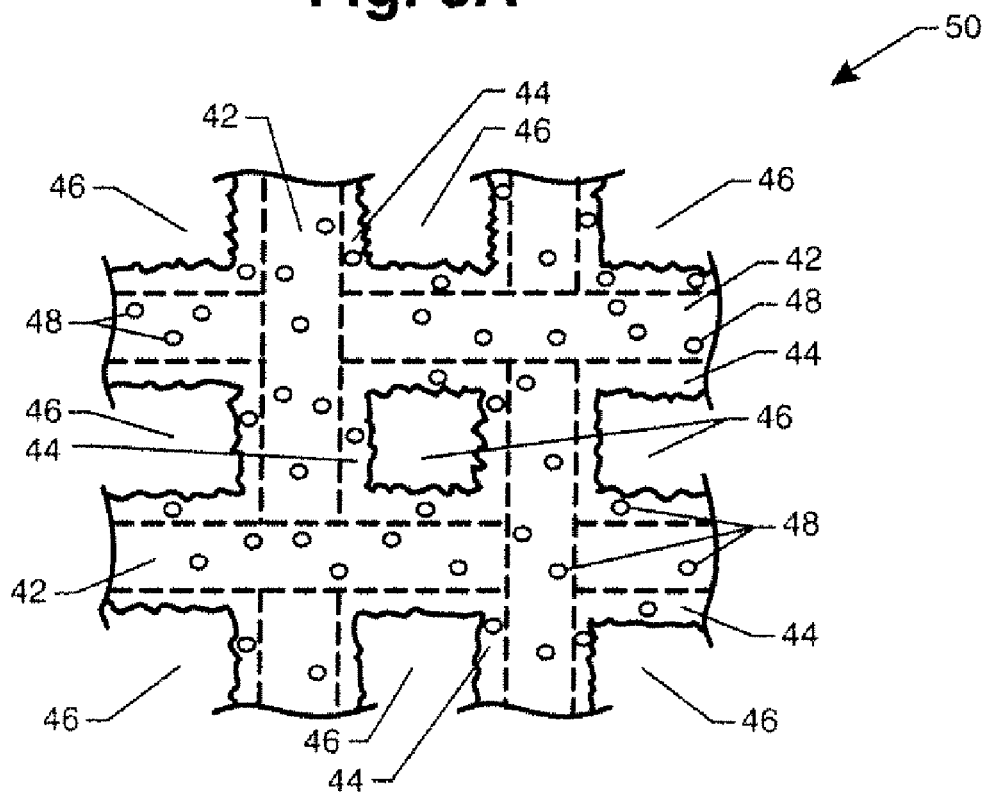
FIG. 3B is a plan view of another example of a fabric section spray coated with metal in accordance with a fabrication step of the present invention.
Figure 3C:
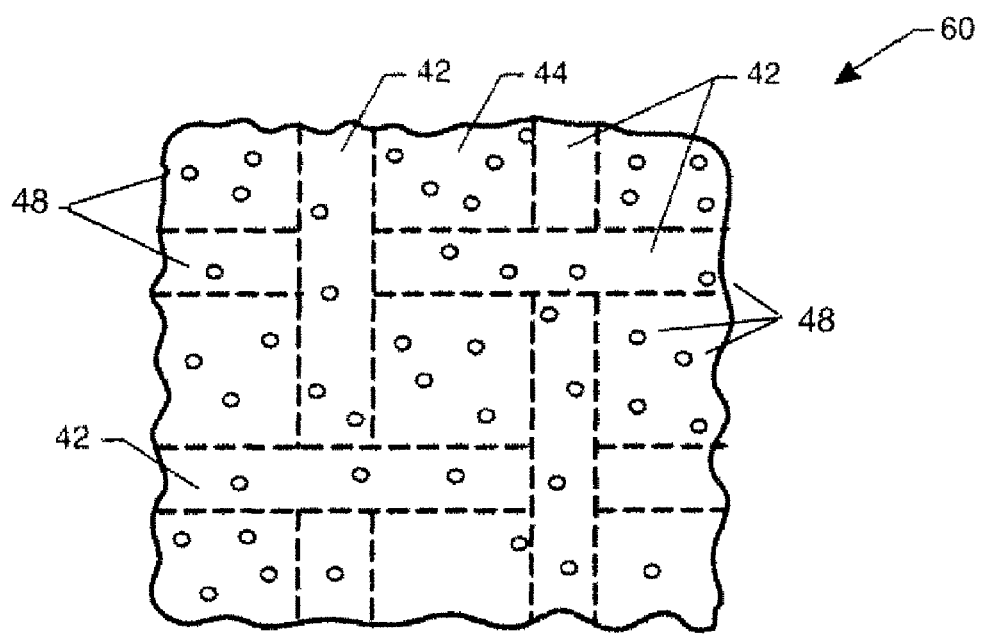
FIG. 3C is a plan view of still another example of a fabric section spray coated with metal in accordance with a fabrication step of the present invention.

Examples of possible metal-coated fiber arrangements that are porous are illustrated in FIGS. 3A-3C. In FIG. 3A, an arrangement 40 includes fibers 42 in a fabric form (e.g., woven together) and then coated with a metal 44 such that interstices 46 will extend through and throughout arrangement 40. In FIG. 3B, an arrangement 50 includes fibers 42 in a fabric form that have been thinly coated (e.g., by a plasma spray deposition process) with a metal 44 such that pores 48 are formed into and/or through metal 44. The size of the spacing between fibers 42 and/or the amount of metal sprayed also allow interstices 46 to also extend through and throughout arrangement 50. In arrangement 60 shown in FIG. 3C, metal 44 completely covers the fabric defined by fibers 42. However, by spraying metal 44 (e.g., by a plasma spray deposition process) at a thickness that allows pores 48 to be formed, arrangement 60 is still porous.

The next fabrication step of the present invention involves forming a layered structure (e.g., a planar or shaped structure) that includes at least one porous, metal-coated fiber arrangement such as arrangement 40. That is, arrangement 40 is a preform for the layered structure. The entirety of the layered structure, to include one or more layers of a porous, metal-coated fiber preform, should be porous. For example, the layered structure could comprise one or more layers of uncoated fiber arrangements that are porous with just one layer of a porous metal-coated fiber preform. In this layered structure, the metal-coated fiber preform can provide lightning protection. In another example, the layered structure could comprise multiple layers of porous metal-coated fiber performs. The resulting layered structure should be porous throughout regardless of the particular construction thereof.

The next fabrication step of the present invention involves the introduction and infusion of a liquid resin throughout the entirety of the layered structure. As mentioned above, the particular method and system used to infuse the pores of the layered structure are not limitations of the present invention. The resin-permeated layered structure is then cured where the curing details would be dictated by the resin as would be well understood in the art. The curing process changes the resin to a polymeric material that bonds to the layered structure and forms a complex matrix that will be contiguous throughout the layered structure. The resulting metal/fiber laminate will have superior mechanical properties since the process of metal coating forms a good bond with the fibers and the polymer matrix couples the layers of the layered structure in a complex fashion.

Figure 4:
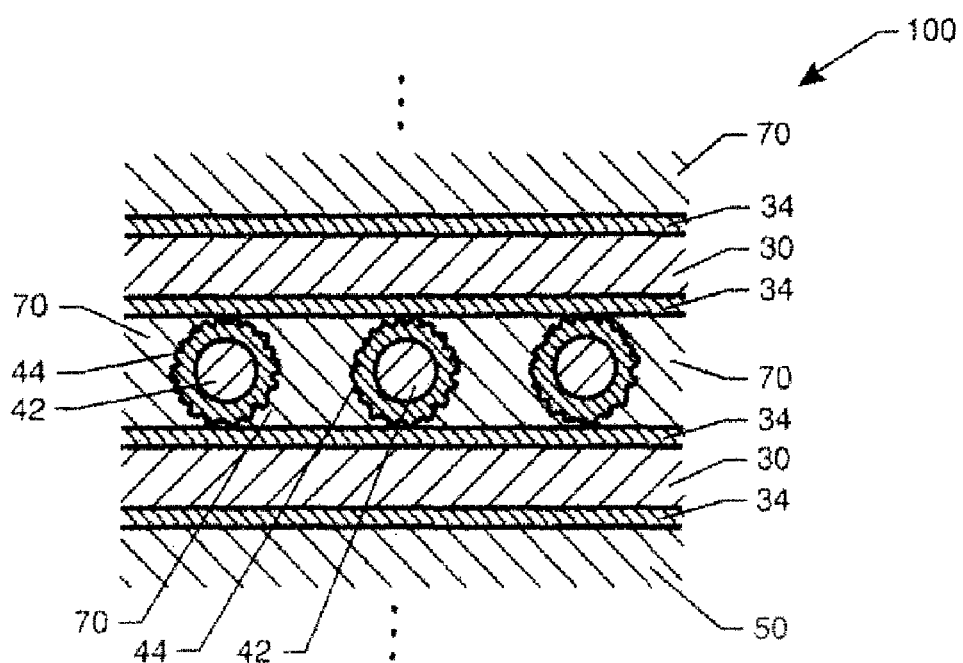
FIG. 4 is a close-up cross-sectional view of a metal/fiber laminate fabricated in accordance with an embodiment of the present invention.

A portion of an example of a metal/fiber laminate constructed in accordance with the present invention is illustrated in FIG. 4 and is referenced generally by numeral 100. In this example, metal/fiber laminate 100 has three layers of the present invention's porous metal-coated fiber performs. More specifically, a top and bottom layer are formed using the above-described unidirectional fibers 30 coated with a metal 34 while the middle layer comprises a metal-coated fiber arrangement porous such as the arrangement shown in FIG. 3A where fibers 42 are coated with metal 44. A cured polymer matrix 70 fills the porosity of the layered structure and bonds well to the rough surfaces defined by metal coatings 34 and 44. It is to be understood that laminates could also be made using the preforms illustrated in FIGS. 3B and 3C.

The advantages of the present invention are numerous. A metal/fiber laminate constructed in accordance with the present invention is readily configured for a variety of applications to include automotive, defense, marine and aerospace applications. The "layers" are bonded by a complex polymer matrix that is contiguous throughout the laminate. Still further, since the present invention can be constructed with electrically-conductive metals (e.g., especially copper and aluminum), the present invention can provide lightning strike protection for structures/vehicles.

Although the invention has been described relative to a specific embodiment thereof, there are numerous variations and modifications that will be readily apparent to those skilled in the art in light of the above teachings. For example, fibers could first be coated with metal with the resulting metal-coated fibers then being processed to form a porous metal-coated fiber arrangement. Furthermore, the porous metal-coated fiber preform (e.g., arrangements 40, 50 and 60 illustrated in FIGS. 3A-3C) of the present invention could also be used in other applications as a construction element or by itself. One such "stand alone" use for the porous preform is as a catalyst screen in a catalytic converter where the metal coating serves as the converter's catalyst material. Still further, the porous metal-coated fiber preforms (e.g., FIGS. 3A-3C) could have a matrix resin impregnated therein to form a prepreg sheet. The impregnated matrix resin could be selected to flow at an elevated temperature, but be solid at room temperature. In this way, a stack of the prepreg sheets could simply be heated to bring about fusion of the various layers in order to form a metal/fiber laminate. It is therefore to be understood that, within the scope of the appended claims, the invention may be practiced other than as specifically described.

What is claimed as new and desired to be secured by Letters Patent of the United States is:

1. A method of fabricating a metal/fiber laminate, comprising the steps of:
    providing a porous arrangement of fibers;
    coating said fibers with a porous metal to form a porous arrangement of porous metal-coated fibers;
    forming a layered structure that includes said porous arrangement of porous metal-coated fibers;
    infusing a liquid resin into said layered structure; and
    curing said liquid resin to form a polymer matrix that permeates said layered structure.

2. A method according to claim 1 wherein said step of coating comprises the step of spraying said metal onto said porous arrangement of fibers.

3. A method according to claim 1 wherein said step of coating comprises the step of spraying said metal using low-pressure radio frequency plasma spray deposition.

4. A method according to claim 1 wherein said porous arrangement of fibers comprises a fabric.

5. A method according to claim 1 wherein said porous arrangement of fibers comprises unidirectionally aligned fibers.

6. A method according to claim 1 wherein said metal is at least one of an electrically-conductive metal and a thermally-conductive metal.

7. A method according to claim 1 wherein said metal is selected from the group consisting of aluminum, copper, nickel, palladium, platinum, titanium, alloys thereof, and combinations thereof.

8. A method according to claim 1 wherein said fibers are selected from the group consisting of glass fibers, carbon fibers, graphite fibers, aramid fibers, polyethylene fibers, polybenzoxazole fibers, and mixtures thereof.

9. A method according to claim 1 wherein said liquid resin is selected from the group consisting of epoxies, cyanates, bismaleimides and imides.

10. A method of fabricating a metal/fiber preform, comprising the steps of:
    providing a porous arrangement of fibers; and
    coating said fibers with a porous metal to form a porous arrangement of porous metal-coated fibers.

11. A method according to claim 10 wherein said step of coating comprises the step of spraying said metal onto said porous arrangement of fibers.

12. A method according to claim 10 wherein said step of coating comprises the step of spraying said metal using low-pressure radio frequency plasma spray deposition.

13. A method according to claim 10 wherein said porous arrangement of fibers comprises a fabric.

14. A method according to claim 10 wherein said porous arrangement of fibers comprises unidirectionally aligned fibers.

15. A method according to claim 10 wherein said metal is at least one of an electrically-conductive metal and a thermally-conductive metal.

16. A method according to claim 10 wherein said metal is selected from the group consisting of aluminum, copper, nickel, palladium, platinum, titanium, alloys thereof, and combinations thereof.

17. A method according to claim 10 wherein said fibers are selected from the group consisting of glass fibers, carbon fibers, graphite fibers, aramid fibers, polyethylene fibers, polybenzoxazole fibers, and mixtures thereof.

18. A method according to claim 10, further comprising the step of impregnating said porous arrangement of porous metal-coated fibers with a matrix resin.

* * * * *